3,391,137
PROCESS FOR PREPARING ω-LACTAMS
Johan A. Bigot, Beek, Limburg, and Pieter L. Kerkhoffs, Geleen, Netherlands, assignors to Stamicarbon N.V., Heerlen, Netherlands
No Drawing. Filed June 10, 1965, Ser. No. 463,019
Claims priority, application Netherlands, June 13, 1964, 6406749
8 Claims. (Cl. 260—239.3)

The present invention relates to processes for the preparation of ω-lactams.

The commercial preparation of ω-lactams is usually by conversion of cyclic ketones to the corresponding oximes, from which the lactams are obtained by Beckmann-type rearrangement with the aid of sulphuric acid. To avoid the separate step of the oxime formation, and the subsequent highly exothermic (and therefore troublesome) rearrangement thereof, it has previously been proposed to convert the cyclic ketones directly to the lactams by use of hydroxylamine sulphate and sulphuric acid.

According to another proposed direct method of caprolactam preparation, cyclohexyl compounds the cyclohexyl group of which contains a tertiary carbon atom, e.g. cyclohexyl ketones, are treated with a nitrosating agent in the presence of sulphuric acid and, if so desired, sulphur trioxide, and the lactam is formed therefrom.

In the preparation of lactams with the aid of sulphuric acid, such acid must be neutralized after termination of the reaction, and as a result large amounts of sulphate salts, usually ammonium sulphate, are obtained, as by-products of little if any value. This circumstance quite unfavorably affects the manufacturing cost.

In the present invention, it has now been found that ω-lactams can be prepared directly from cycloalkyl ketones, having the general formula R—CO—R$^1$, where R and R$^1$ are hydrocarbon groups of at most about 12 carbon atoms, of which at least one is a cycloalkyl group, by direct reaction with a nitrosating agent, if the reaction is carried out in the presence of boron trifluoride.

By the reaction with a nitrosating agent, the cycloalkyl group R or R$^1$ of the ketone is converted to the corresponding ω-lactam. The by-product formed is a carboxylic acid derivative, which can be converted to a carboxylic acid by hydrolysis.

The following products are thus formed from the indicated starting materials:

Caprolactam and acetic acid from cyclohexyl methyl ketone
Caprolactam and propionic acid from cyclohexyl ethyl ketone
Valerolactam and acetic acid from cyclopentyl methyl ketone
Caprolactam and benzoic acid from cyclohexyl phenyl ketone
Capryl lactam and acetic acid from cyclo-octyl methyl ketone
Laurinolactam and acetic acid from cyclododecyl methyl ketone In the special case when a dicycloalkyl ketone is employed, a cycloalkyl carboxylic acid derivative by-product is first formed beside the lactam product. This derivative, or (after hydrolysis), the corresponding cycloalkyl carboxylic acid, may then be reacted further with the nitrosating agent to yield additional lactam products. Thus, from 1 mole of dicyclohexyl ketone, there may be produced 2 moles of caprolactam and from 1 mole of cyclohexyl cycloheptyl ketone, there may be produced 1 mole of caprolactam and 1 mole of oenantholactam.

Examples of nitrosating agents useful in the practice of this invention are: nitrosyl nitrite, nitrosyl nitrate, nitrosyl chloride, nitrosyl fluoride, nitrosyl bromide, nitrosyl hydrosulphate, nitrosyl perchlorate, nitrosyl fluorosulphite, nitrosyl hydroselenate, dinitrosyl selenate, dinitrosyl pyrosulphate, and in general nitrosyl compounds in which a mineral acid residue is bound to a nitrosyl group. Mixtures of nitrogen monoxide and chlorine, forming, effectively, nitrosyl chloride in situ, may also be used.

The process according to the invention may be carried out by passing gaseous boron trifluoride into the liquid cycloalkyl ketone, while the nitrosating agent is added simultaneously or subsequently. It is also possible to use an addition compound of the nitrosating agent and boron trifluoride, e.g., nitrosyl chloride-boron trifluoride, in the reaction with the cycloalkyl ketone.

It is not necessary then to use high pressures, as a simple mode of operation is possible at atmospheric pressure, so that no high-pressure equipment is required. The production capacity of the plant may, however, be increased by the use of higher pressures, e.g. 5, 15, 30, 100 atm. or still higher pressures.

The temperature to be employed may also be varied. It is possible and appropriate to use low temperatures of about 0° C. on starting the reaction and then to raise or allow the temperature to increase to 15–150° C. Use may also be made of higher temperatures, e.g., in the range 200–250° C., in conjunction with an elevated pressure.

Reaction solvents may also be used. As a result, the rapid course of the reaction is promoted, and the processing of the reaction products is moreover simplified. Especially suitable solvents are the normally liquid saturated lower alkyl hydrocarbons, e.g., heptane, octane, cyclohexane, and nitro compounds or halogen compounds of saturated lower alkyl hydrocarbons, such as nitroethane, nitrohexane, and heptyl chloride.

According to a preferred practice of the process of the invention, the reaction is carried out in the presence of water. The use of water causes the resulting carboxylic acid derivative to be hydrolysed, thereby preventing the formation of undesirable by-products. By using also a solvent that is immiscible with water whereby two liquid phases are formed, the working up of the reaction products is facilitated.

EXAMPLE I

In a 1-liter reaction vessel provided with a stirrer and a reflux cooler, 50 ml. of water is saturated with boron trifluoride at a temperature of 0.5° C. Then 154 g. (1 mole) of cyclooctyl methyl ketone dissolved in 500 ml. of n-heptane is added with simultaneous stirring and 50 ml. (1 mole) of nitrosyl chloride is slowly fed in half an hour at a temperature of 4–6° C.

Stirring is continued while the temperature is kept at 15–20° C. for one hour and then raised to about 98° C., when the reaction mixture boils.

Stirring is stopped after one hour, and then two liquid layers are allowed to form. The heptane layer (top layer) is then separated from the bottom layer, which is washed and extracted with heptane. 12 g. of unconverted cyclooctyl methyl ketone is recovered from the separated heptane solutions.

The bottom layer is then neutralized with an aqueous sodium-hydroxide solution to a pH of about 6, and extracted with chloroform. From the chloroform solution, 128 g. of capryl lactam is obtained (efficiency 98%).

EXAMPLE II

In the apparatus used in Example I, 25.2 g. (0.2 mole) of cyclohexyl methyl ketone is dissolved in 250 ml. of n-heptane, after which the solution is saturated with boron trifluoride at a temperature of 10° C. Then 7 ml. of water saturated with boron trifluoride (temperature:

10° C.) and 10 g. (0.15 mole) of nitrosyl chloride are added with simultaneous stirring.

The temperature is then slowly raised in half an hour until the reaction mixture boils (98° C.), after which stirring is continued for half an hour at the boiling temperature.

After stirring is stopped, the two layers are allowed to form and are separated. After washing with water, 10.5 g. of cyclohexyl methyl ketone is recovered from the heptane layer. After being neutralized with an aqueous sodium-hydroxide solution, the bottom layer is extracted with chloroform. From the chloroform solution 13 g. of caprolactam is obtained (efficiency 98.6).

What is claimed is:

1. A process for the preparation of an ω-lactam from a cycloalkyl ketone of the general formula R—CO—$R^1$, where R and $R^1$ are hydrocarbon groups of at most about 12 carbon atoms and of which at least one is a cycloalkyl group, which comprises reacting said ketone with a nitrosating agent in contact with water and boron trifluoride whereby an ω-lactam corresponding to the cycloalkyl group is formed.

2. A process according to claim 1 wherein R and $R^1$ are aliphatically saturated hydrocarbon radicals.

3. A process according to claim 1 wherein R and $R^1$ are independently selected from the class consisting of alkyl, monocyclic carboxylic aryl and cycloalkyl.

4. A process according to claim 1 wherein both R and $R^1$ stand for a cycloalkyl group.

5. A process according to claim 4 wherein R and $R^1$ each stand for the same cycloalkyl group.

6. A process according to claim 1 wherein the reaction is conducted in contact with water and a water-immiscible solvent.

7. A process according to claim 1 wherein the nitrosating agent is a nitrosyl compound having a mineral acid radical bonded to the nitrosyl group.

8. A process according to claim 7 wherein the nitrosating agent is selected from the group consisting of nitrosyl nitrite, nitrosyl nitrate, nitrosyl chloride, nitrosyl fluoride, nitrosyl bromide, nitrosyl hydrosulphate, nitrosyl perchlorate, nitrosyl fluorosulphite, nitrosyl hydroselenate, dinitrosyl selenate and dinitrosyl pyrosulphate.

References Cited

UNITED STATES PATENTS

| 3,022,291 | 2/1962 | Muench et al. | 260—239.3 |
| 3,144,748 | 12/1963 | Bigot et al. | 260—239.3 |

FOREIGN PATENTS 1,238,981   8/1960   France.

JOHN D. RANDOLPH, *Primary Examiner.*

WALTER A. MODANCE, JAMES A. PATTEN,
*Examiners.*

R. T. BOND, *Assistant Examiner.*